INVENTOR.
MAX BENTELE
BY
*William V. Ebs*
ATTORNEY

INVENTOR.
MAX BENTELE

United States Patent Office 3,438,198
Patented Apr. 15, 1969

3,438,198
SMOG CONTROL SYSTEM
Max Bentele, Ridgewood, N.J., assignor to Curtiss-Wright Corporation, a corporation of Delaware
Filed May 22, 1967, Ser. No. 640,147
Int. Cl. F01n 1/14, 3/10
U.S. Cl. 60—30            12 Claims

ABSTRACT OF THE DISCLOSURE

The quantity of deleterious materials in the waste gases of an internal combustion engine is reduced in an exhaust system wherein air is injected into the exhaust gas stream, and strategically located mixing devices promote the oxidation of unburned materials in the exhaust by thoroughly mixing the air with the exhaust gases and increasing the time available for the oxidation of such materials in the system.

Background of the invention

My invention relates to smog control systems. More particularly, the invention is directed to a system for reducing the quantity of unburned hydrocarbons and other deleterious substances discharged by internal combustion engines into the atmosphere.

It is a primary object of the invention to promote the oxidation of incompletely burned exhaust gases in the exhaust system of an internal combustion engine.

It is another object of the invention to provide for the introduction of air into the exhaust system of an internal combustion engine where exhaust gases enter the system and to effectively intermix the air and exhaust gases to promote the oxidation of incompletely burned materials in the exhaust.

It is still another object of the invention to provide an internal combustion engine exhaust system in which a plurality of devices for producing turbulence in flow are judiciously arranged to efficiently promote the oxidation of incompletely burned materials in the exhaust.

It is yet another object of the invention to reduce the quantity of unburned hydrocarbons and other deleterious materials in the exhaust of an internal combustion engine by introducing air for combustion into the exhaust gas stream and increasing the time available for the oxidation of such materials with the aid of flow-mixing devices strategically located in an exhaust system.

It is a further object of the invention to improve the exhaust systems of multiunit rotary combustion engines.

It is still a further object of the invention to provide an improved exhaust system by means of which the quantity of unburned materials in the exhaust of internal combustion engines may be reduced and which can be economically manufactured from simply-constructed components.

Other objects and advantages of the invention will become apparent during a reading of the specification taken in connection with the accompanying drawings.

Description of the drawings

Referring to FIG. 1 of the drawings, reference character 10 designates an exhaust manifold according to the invention for use on an internal combustion engine. The manifold, as shown, includes a plurality of branch conduits such as 12 and 14 into which the exhaust from an engine may discharge, and a connecting main conduit 16 through which the exhaust gases must flow before being expelled into the atmosphere. Branch conduits 12 and 14 are flanged as shown at 16 and 17 where they may be bolted to engine structure. Although two conduits 12 and 14 for receiving engine exhaust gases have been shown, a different number of such conduits may be called for. The required number of such conduits is, of course, determined by the particular engine for which the manifold is intended.

Figure 1:
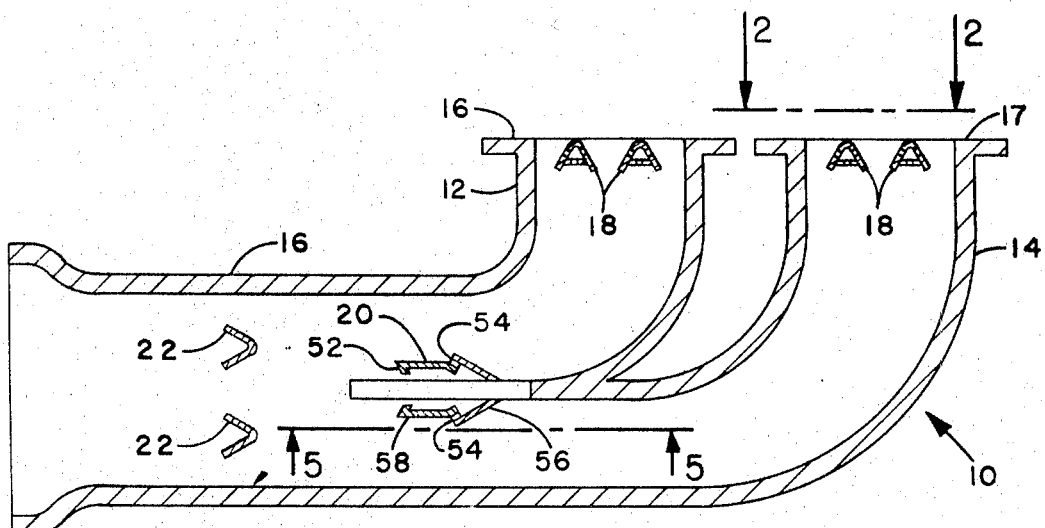
FIG. 1 is a longitudinal sectional view of an engine exhaust manifold in which a plurality of flow-mixing devices are arranged according to the invention.
Figure 2:
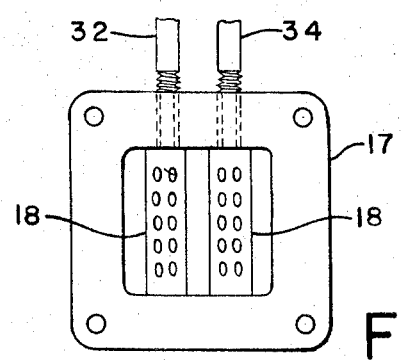
FIG. 2 is an end view of one conduit of the manifold taken on the plane of the line 2—2 of FIG. 1.

In the manifold of FIG. 1, flow-mixing devices 18 of one type are provided in the branch conduits where exhaust gases enter the manifold. A flow-mixing device 20 of another type is provided at the juncture of the branch conduits, and flow-mixing devices 22 similar in design to the devices 18 are provided near the exit end of the manifold. Preferably, in exhaust systems constructed according to the invention, sufficient unblocked cross-sectional area is provided for at each of the various locations of the flow-mixing devices such that their presence does not result in any substantial increase in engine back pressure.

The flow-mixing devices 18 and 22 are channel-like structures having a converging end and opposite open end. Such devices are oriented in the manifold so that their converging ends face upstream with respect to the direction of gas flow. Preferably, the devices 18 and 22 are V-shaped as shown, however, they may be semi-cylindrical in form or have any other shape suitable for creating turbulence in their wake as in the manner shown by dotted flow lines 23 in FIG. 3. The flow-mixing devices 18 and 22 may be welded to the inside of the conduits in which they are located or secured thereto in any other suitable manner. A bridging plate 24 provided in flow-mixing devices 18 (but not in devices 22) between sides 26 and 28 forms a passage 30 into which air may be introduced as by way of lines 32 and 34. Such plate 24 and the sides 26 and 28 each include a plurality of openings 36, 38, and 40 respectively through which air may issue into the conduits 12 and 14.

Figures 3, 4:
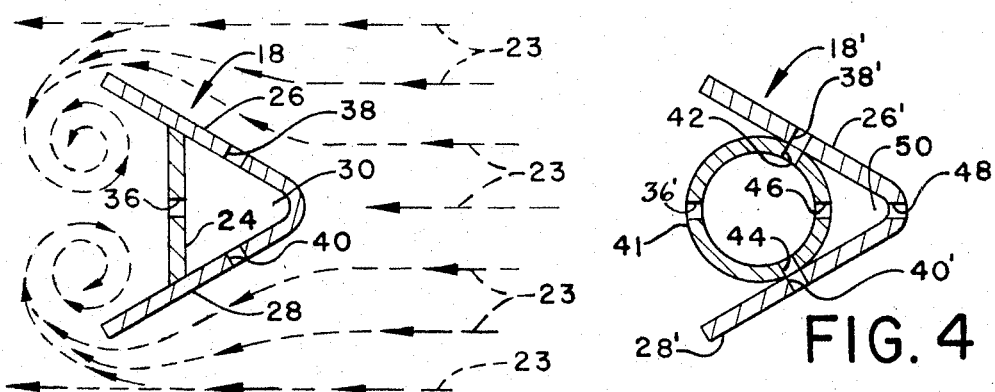
FIG. 3 is an enlarged cross-sectional view taken through a flow-mixing device of FIG. 1.
FIG. 4 is an enlarged cross-sectional view of a modified flow-mixing device of the type shown in FIG. 3.
Figure 5:
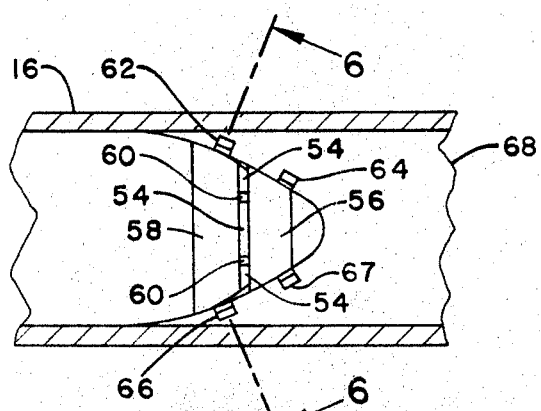
FIG. 5 is an enlarged view taken on the plane of the line 5—5 of FIG. 1 and showing another type of flow-mixing device.
Figure 6:
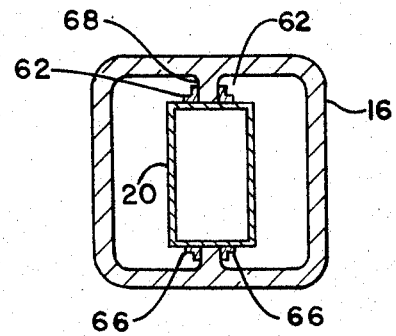
FIG. 6 is a cross-sectional view taken on the plane of the line 6—6 of FIG. 5.

A modified flow-mixing device 18' for use at the entrance of each of the branch conduits 12 and 14 of the manifold is shown in FIG. 4. Such flow-mixing device 18' has a tubular air line 41 welded or otherwise affixed between sides 26' and 28' of the device and has openings 38' and 40' in each of the sides aligned with openings 42 and 44 respectively in the line such that air may be expelled through the aligned openings into the region about the device. Openings 46 are provided in the line 41 and openings 48 are provided at the juncture of sides 26' and 28'. Air may, therefore, issue into space 50 for discharge through the openings 48. Additional openings 36' may also be provided in the tubular member opposite openings 46, through which air may be caused to flow directly into the passages in a downstream direction.

Flow-mixing device 20 which is secured in the manifold at the juncture of conduits 12 and 14 is adapted to recirculate at least a portion of the exhaust gases which flow from the conduits 12 and 14 into connecting conduit 16. The device 20 is a container-like structure having an open end 52 and passages 54 between spaced apart portions 56 and 58 which may be connected as by ribs 60. Right angle pieces 62, 64 and 66 and 67 on the device 20 embrace the terminal portion of the wall 68 common to branch conduits 12 and 14 and thereby center the flow control device with respect to main conduit 16. The flow-mixing device 20 may be affixed longitudinally in the manifold in any suitable manner as, for example, by welding pieces 62 and 66 to the wall 68.

Preferably, air is supplied to the exhaust gases entering the manifold through flow-mixing devices 18 or alternate devices 18' at a controlled rate, as for example, by an air pump driven according to engine speed, such that the quantity of air discharged into the stream of exhaust gases increases when the flow of exhaust gas increases, the quantity of air discharged decreases when the flow of exhaust gas decreases, and the amount of air needed to promote the burning of incompletely burned materials and effect a significant reduction therein is supplied to the manifold under all operating conditions of the engine to which the manifold is connected. The flow-mixing devices 18 (or 18'), by creating turbulence in the flow into conduits 12 and 14, promote the intermixing of injected air with entering exhaust gases and thereby the oxidation of unburned materials in the exhaust gases. Such flow-mixing devices 18 (or 18') also increase the lengths of the paths of flow of exhaust gases and air to increase the time available for oxidation of the unburned materials. The other flow-mixing devices 20 and 22 also create turbulence in the exhaust gases and increase the time available for the oxidation of unburned materials. Flow-mixing device 20 is particularly effective in increasing the available reaction time for oxidation since gases recirculate through the device.

Each of the flow-mixing devices 18 (or 18') at the entrance of branch conduits 12 and 14, and each of the flow-mixing devices 22 near the exit end of the manifold may be replaced with a flow-mixing device similar to the device 20 provided at the juncture of conduits 12 and 14. In such event, the recirculating devices at the entrance of the conduits 12 and 14 would be modified to provide for the injection of air into the exhaust gases. Such a modified device 20' as shown in FIG. 7 includes openings 70 and 72 in portion 56' and opening 74 in a wall 76 forming a space 78 in the converging end of the device into which compressed air may be introduced and from which air may issue.

Figure 7:
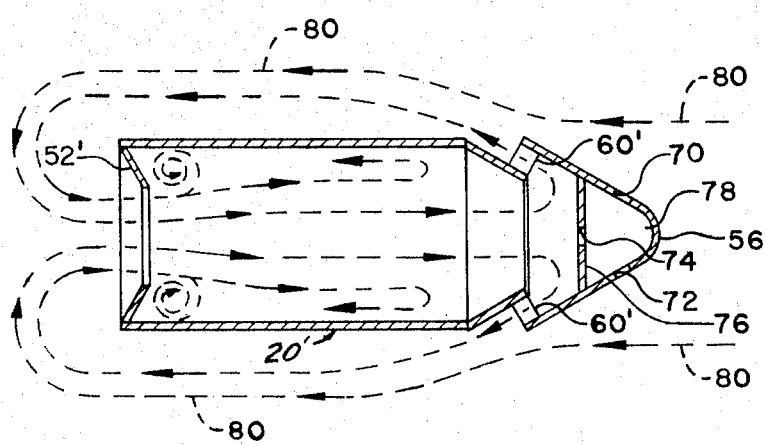
FIG. 7 is an enlarged cross-sectional view showing a modified flow-mixing device of the type shown in FIGS. 5 and 6.

The manner in which gases are recirculated through flow-mixing devices such as 20 and 20' is illustrated in FIG. 7. The device, which in general functions to induce the recirculation of gases in the same manner as the flame tubes of Patent 2,941,362 of F. W. Bailey for Flame Holder Construction, issued June 21, 1960, is shown normally oriented in a gas stream which is indicated by dotted lines 80. As may be seen, gases are caused to enter the device through the downstream open end 52' and to flow toward the upstream end portion where they exit between spaced ribs 60'. Flow-mixing device 20' may be rectangular in cross-section like flow control device 20, but may also be circular in cross-section or formed to any other suitable configuration.

Figure 8:
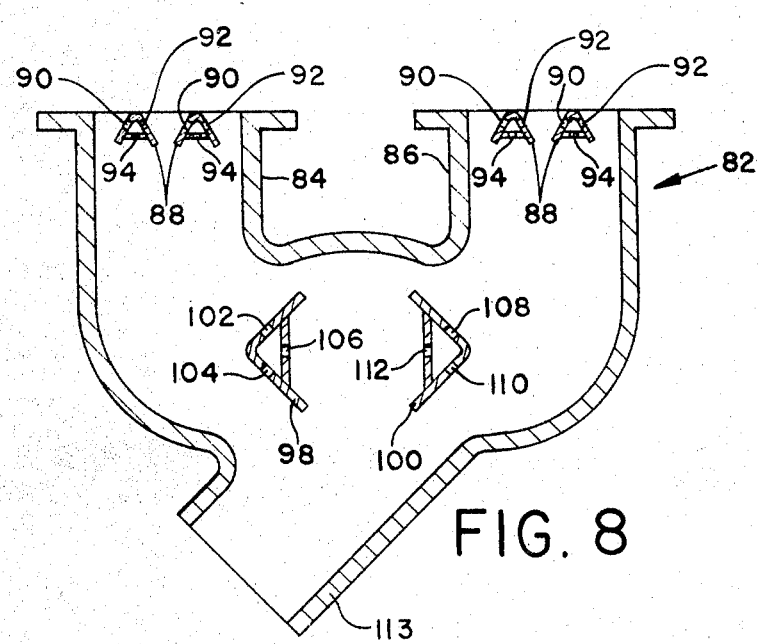
FIG. 8 is a sectional view showing another engine exhaust manifold according to the invention.

FIG. 8 shows a modified engine manifold 82 for use on a two cylinder conventional engine, or a two unit rotary combustion engine of the type shown for example in Patent 3,096,746 of F. P. Sollinger, issued July 9, 1963. The manifold 82 includes conduits 84 and 86 into which exhaust gases from an engine may discharge. As shown, flow-mixing devices 88 which are like the flow-mixing devices 18 of FIG. 1 are provided in the conduits 84 and 86 where exhaust gases enter the manifold. Such flow-mixing devices 88 include openings 90, 92, and 94 for injecting air into the exhaust gas stream. The manifold is so arranged that gases flowing through the conduits 84 and 86 discharge in generally opposite directions into a region therebetween provided with large flow-mixing devices 98 and 100 which are like the flow-mixing devices 88. Flow-mixing devices 98 and 100 are oppositely oriented in the manifold, and arranged so that the converging end of one device is directed toward the exit of one of the said conduits 84 and 86 and the converging end of the other device is directed toward the exit of the other conduit. Openings 102, 104, and 106 are provided in flow-mixing device 98 and openings 108, 110, and 112 are provided in flow-mixing device 100 for admitting air into region 90 of the manifold.

Figure 9:
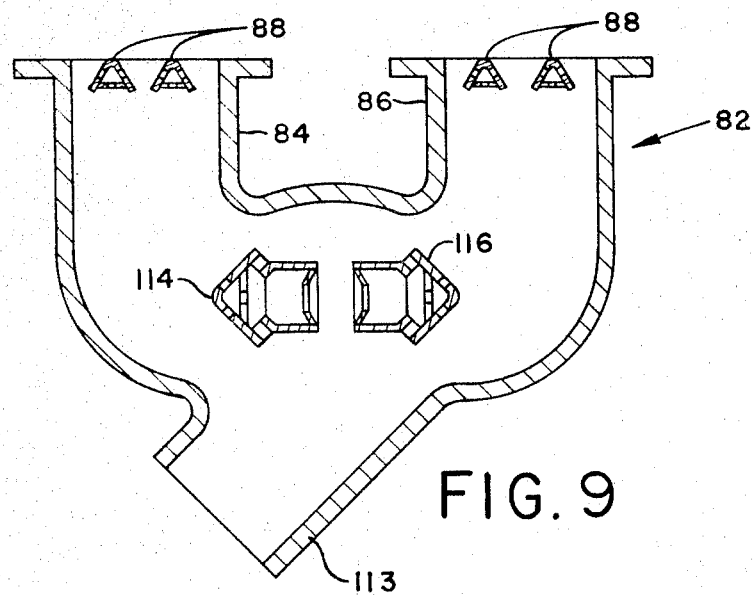
FIG. 9 is a sectional view showing a modified version of the engine exhaust manifold of FIG. 8.
Figure 10:
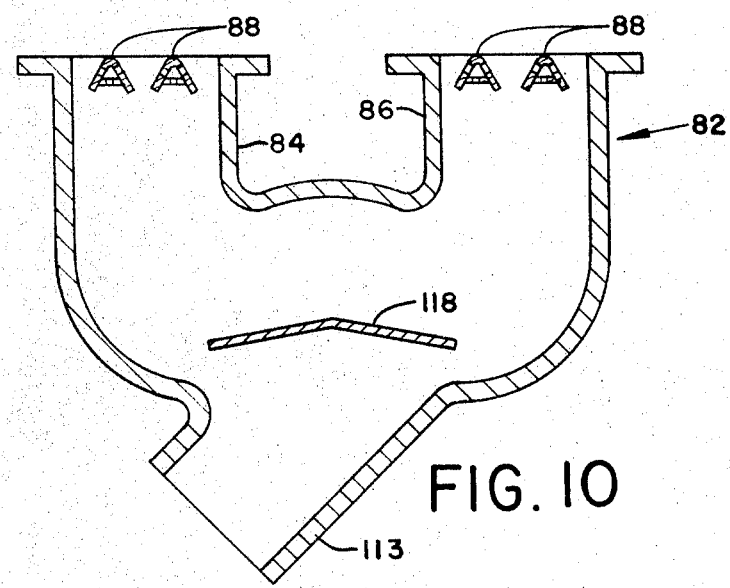
FIG. 10 is a sectional view showing another modified version of the engine exhaust manifold of FIG. 8.

The flow-mixing devices 88, 98, and 100 promote the intermixing of injected air with exhaust gas and also lengthen the paths of flow of gases to increase the reaction time for the oxidation of incompletely burned materials in manifold 82. The intermixing of injected air with exhaust gas is further promoted and the reaction time for oxidation is further increased by having the manifold arranged so that gases from conduits 84 and 86 flow into the region between these conduits in the manner already noted, that is, in generally opposite directions. As a result, gases which eventually flow from the manifold through exit conduit 113 are substantially free of unburned hydrocarbons and other deleterious materials. If it is desired to slow down the reaction time for the oxidation of exhaust gases to a still greater extent, flow-mixing devices 114 and 116 corresponding in construction to the flow-mixing devices of FIG. 7 may be substituted in the manifold 82 for the devices 98 and 100 (see FIG. 9). A somewhat simpler but still effective arrangement results if only a large angled channel 118 is used in the region between the conduits 84 and 86 as shown in FIG. 10.

Figure 11:
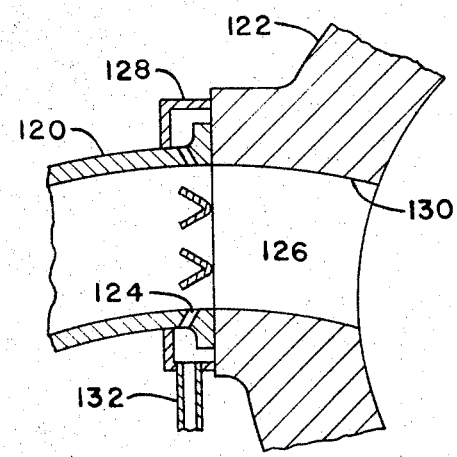
FIG. 11 is a fragmentary sectional view showing a modified manifold conduit and rotary engine housing.

While the manifolds of FIGS. 1, 8, 9 and 10 have been described as adapted to provide for the injection of air through flow-mixing devices, it should be appreciated that the flow-mixing devices are not the only means by which air may be introduced into an exhaust system according to the invention to promote combustion. For example, air may be introduced directly into the gas stream through openings provided in the manifold for this purpose. Referring to FIG. 11, showing a conduit 120 of a manifold according to the invention in an assembled position against the housing 122 of a rotary combustion engine, openings for air in the manifold may be seen at 124 substantially in the plane of flow-mixing devices 126. With such openings spaced around the conduit 120 and an annular shroud 128 over the openings to which air may be supplied as through line 132, air may be conveniently introduced into the manifold to support the combustion of unburned materials in exhaust gases discharged into the manifold through engine exhaust port 130. Similar provisions may also be made for the introduction of air at other locations along the manifold as required.

Figure 12:
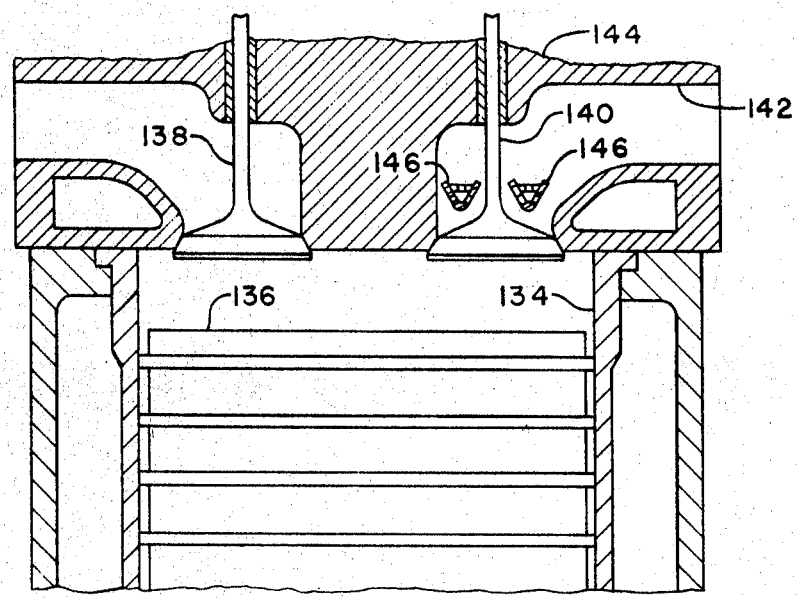
FIG. 12 is a fragmentary vertical sectional view showing flow-mixing devices in an exhaust passage of a conventional internal combustion engine.

In the case of conventional internal combustion engines all or part of the air supplied to the exhaust gases may be introduced in the vicinity of the exhaust valves to take advantage of the turbulence which is generated by the annular conical gap between the exhaust valves and their seats. As indicated in FIG. 12 which shows a conventional engine cylinder 134 and piston 136 with intake and exhaust valves 138 and 140 respectively for the cylinder, air may be supplied to the exhaust passage 142 in the engine head 144 through flow-mixing devices 146 located just over the exhaust valve. Alternatively, the air may be supplied to the region over the valve directly through a tube and the flow-mixing devices eliminated at this location.

Figure 13:
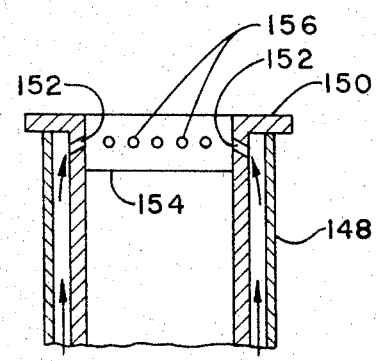
FIG. 13 is a fragmentary longitudinal sectional view of an exhaust manifold adapted to heat air prior to injection into the exhaust gas stream.

The effectiveness of the exhaust systems described may be improved by the introduction of heated rather than cool air. The air to be added to the exhaust gases may be readily heated by having it flow over the hot walls of the exhaust manifold prior to injection. A jacket 148, such as shown, for example, in FIG. 13, may be provided about the conduits of a manifold 150 and the air caused to flow through the jacket before it passes through manifold passages 152 into a flow-mixing device 154 for injection through openings 156 into the gas stream.

I claim:

1. In an exhaust system for an internal combustion engine, means forming passages for exhaust gases; a plurality of flow-mixing devices located in the passages, each said device having a converging end and an opposite open end, and each such device being oriented within the passage forming means so that the converging end faces upstream relative to the general direction of flow of exhaust gases over the device; and means for supplying air to the passages at locations upstream from one or more of the flow-mixing devices; wherein at least some of the flow-mixing devices are connected to the means for supplying air and each such flow-mixing device connected to the means for supplying air includes a conduit for air and openings therein through which air may be introduced into the passages; and wherein each of the flow-mixing devices connected to the means for supplying air has sides forming a channel and including at least some of the openings, and has a wall which bridges the sides to form said conduit.

2. The combination of claim 1 wherein the said wall also includes some of the openings through which air may be introduced into the passages.

3. In an exhaust system for an internal combustion engine, means forming passages for exhaust gases; a plurality of flow-mixing devices located in the passages, each said device having a converging end and an opposite open end, and each such device being oriented within the passage forming means so that the coverging end faces upstream relative to the general direction of flow of exhaust gases over the device; and means for supplying air to the passages at locations upstream from one or more of the flow-mixing devices; wherein at least some of the flow-mixing devices are connected to the means for supplying air and each such flow-mixing device connected to the means for supplying air includes a conduit for air and openings therein through which air may be introduced into the passages; and wherein each of the flow-mixing devices connected to the means for supplying air has sides forming a channel, a tubular member between the sides, and communicating openings in the sides and tubular member through which air may be introduced into the passages.

4. The combination of claim 3 wherein the tubular member includes additional openings through which air may be caused to flow directly into the passages in a downstream direction.

5. An exhaust manifold for an internal combustion engine comprising plural passages, each to receive a portion of the exhaust gases from the engine; a common passage for the exhaust gases connected to said plural passages and into which exhaust gases may flow from the plural passages; one or more flow-mixing devices in each of the plural passages having a converging end and an opposite open end, each such flow-mixing device including a conduit for air and openings through which air may flow from the conduit into the passage in which the device is located; air supply means connected to each of the flow-mixing devices in the plural passages; a flow-mixing device at the juncture of the plural passages and common passage having a converging end, an opposite open end and educer passages to promote the recirculation of gases flowing over the device; and one or more flow-mixing devices located downstream from the flow-mixing device at said juncture and having converging sides forming a channel; each of the flow-mixing devices in the manifold being oriented so that the converging end faces upstream with respect to the general directional flow of gases over the device.

6. An exhaust manifold as defined in claim 5 wherein the flow-mixing devices in the plural passages each include educer passages to promote the recirculation of gases flowing over the device.

7. An exhaust manifold for an internal combustion engine comprising means forming two passages, each to receive exhaust gases from the engine; a housing section between the passages connected at opposite ends to the passage forming means to receive gases from the said two passages; a pair of flow-mixing devices in the housing, each with a converging end and an opposite open end, the devices being oriented in the housing section so that the converging end of one device faces upstream with respect to flow into the housing section from one of the said two passages and the converging end of the other device faces upstream with respect to flow into the housing section from the other of the two passages; and means for supplying air to the housing section; said housing section having an exit from which the gases may eventually escape.

8. An exhaust manifold as defined in claim 7 wherein the flow-mixing devices in the housing section each include educer passages to promote the recirculation of gases flowing over the device.

9. An exhaust manifold as defined in claim 7 wherein the flow-mixing devices each include a conduit for air and openings therein through which air may be introduced into the housing section, and wherein the air supply means connects with the conduit in each device.

10. An exhaust manifold as defined in claim 7 including one or more flow-mixing devices in each of the said two passages having a converging end and an opposite open end, the flow-mixing devices in said two passages each having a conduit for air and openings therein through which air may be introduced into the passages, and the air supply means being connected with each conduit, each of the flow-mixing devices in the said two passages being oriented so that the converging end faces upstream with respect to the general direction of flow over the device.

11. An exhaust manifold as defined in claim 7 including one or more flow-mixing devices in each of the said two passages having a converging end and an opposite open end, each of the flow-mixing devices in the passages and housing section having a conduit for air and openings therein through which air may be introduced into the manifold, and the air supply means being connected with each conduit, each of the flow-mixing devices in the said two passages being oriented so that the converging end faces upstream with respect to the general direction of flow over the device.

12. An exhaust manifold for an internal combustion engine comprising means forming two passages, each to receive exhaust gases from the engine; a housing section between the passages connected at opposite ends to the said two passages, the housing having an exit from which gases may escape; one or more flow-mixing devices in each of the said two passages having a converging end and an opposite open end, the flow-mixing devices in said two passages each having a conduit for air and openings therein through which air may be introduced into the passages; air supply means connected to each conduit in a flow-mixing device; and a single flow-mixing device located over the housing exit having a converging end and an open end, such single flow-mixing device being so oriented in the manifold that the open end faces said exit.

References Cited

UNITED STATES PATENTS

| 2,038,567 | 4/1936 | Ittner | 60—30 |
| 2,851,852 | 9/1958 | Cornelius | 60—30 |
| 3,166,895 | 1/1965 | Slayter | 60—30 |
| 3,285,709 | 11/1966 | Ennarino | 60—29 |

CARLTON R. CROYLE, *Primary Examiner.*

DOUGLAS HART, *Assistant Examiner.*

U.S. Cl. X.R.

23—277